(12) United States Patent
Rahimi et al.

(10) Patent No.: US 11,401,429 B2
(45) Date of Patent: Aug. 2, 2022

(54) AQUEOUS INK COMPOSITIONS

(71) Applicant: Hewlett-Packard Development Company, L.P., Fort Collins, CO (US)

(72) Inventors: Alireza Rahimi, San Diego, CA (US); George Sarkisian, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 377 days.

(21) Appl. No.: 16/310,064

(22) PCT Filed: Sep. 26, 2016

(86) PCT No.: PCT/US2016/053726
§ 371 (c)(1),
(2) Date: Dec. 14, 2018

(87) PCT Pub. No.: WO2018/057032
PCT Pub. Date: Mar. 29, 2018

(65) Prior Publication Data
US 2019/0300729 A1 Oct. 3, 2019

(51) Int. Cl.
*C09D 11/033* (2014.01)
*B41M 5/00* (2006.01)
(Continued)

(52) U.S. Cl.
CPC ........... *C09D 11/033* (2013.01); *B41J 2/2107* (2013.01); *B41J 2/2114* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 6,821,329 B2 | 11/2004 | Choy |
| 7,950,794 B2 | 5/2011 | Vanini |

(Continued)

FOREIGN PATENT DOCUMENTS

| CN | 101541895 | 9/2009 |
| CN | 103319953 | 9/2013 |

(Continued)

OTHER PUBLICATIONS

International Search Report dated May 25, 2017 for PCT/US2016/053726, Applicant Hewlett-Packard Development Company, L.P.

*Primary Examiner* — Manish S Shah
(74) *Attorney, Agent, or Firm* — Thorpe North & Western LLP

(57) ABSTRACT

The present disclosure is drawn to aqueous ink compositions, methods of printing on offset coated print media, and printing systems. In one example, the aqueous ink compositions can include from 2 wt % to 5 wt % pigment, from 70 wt % to 95 wt % water, from 1 wt % to 10 wt % binder, from 0.1 wt % to 3 wt % non-ionic surfactant, from 1 wt % to 15 wt % humectant solvent including a hydrophilic group, and from 0.3 wt % to 4.5 wt % non-volatile glycol ether co-solvent having a boiling point of 220 C or greater.

17 Claims, 3 Drawing Sheets

(51) Int. Cl.
*C09D 11/102* (2014.01)
*C09D 11/037* (2014.01)
*B41J 2/21* (2006.01)

(52) U.S. Cl.
CPC ......... *B41M 5/0023* (2013.01); *C09D 11/037* (2013.01); *C09D 11/102* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 2002/0029723 A1 | 3/2002 | Fox et al. | |
| 2002/0071701 A1* | 6/2002 | Sullivan | B41J 11/002 399/365 |
| 2004/0068030 A1* | 4/2004 | Aida | C09D 11/326 523/160 |
| 2007/0219290 A1* | 9/2007 | Sarkisian | C09D 11/30 523/160 |
| 2007/0225400 A1* | 9/2007 | Schmid | C09D 11/30 523/160 |
| 2009/0163615 A1 | 6/2009 | Halahmi et al. | |
| 2009/0295847 A1 | 12/2009 | Mukai et al. | |
| 2012/0252948 A1 | 10/2012 | King et al. | |
| 2014/0066550 A1 | 3/2014 | Shigemori et al. | |
| 2014/0364548 A1* | 12/2014 | Everhardus | C09D 11/38 524/166 |
| 2015/0077480 A1* | 3/2015 | Fujii | B41J 2/40 347/86 |
| 2016/0108262 A1* | 4/2016 | Farrugia | C09D 11/106 524/145 |

FOREIGN PATENT DOCUMENTS

| | | |
|---|---|---|
| CN | 104650651 | 5/2015 |
| EP | 1304364 | 4/2003 |
| EP | 1308491 | 5/2003 |
| EP | 1320574 | 5/2006 |
| JP | 2014025067 | 2/2014 |
| WO | 2006099513 | 9/2006 |
| WO | 2018017305 | 1/2018 |

* cited by examiner

AQUEOUS INK COMPOSITIONS

BACKGROUND

Digital printing allows for digital files to be printed directly without the use of printing plates and has short turn-around times. These advantages have increased the demands of digital printing and this area of printing continues to grow and evolve. As this area continues to expand, it reaches new markets and consumers creating a demand for new materials.

DETAILED DESCRIPTION

Figure 1:
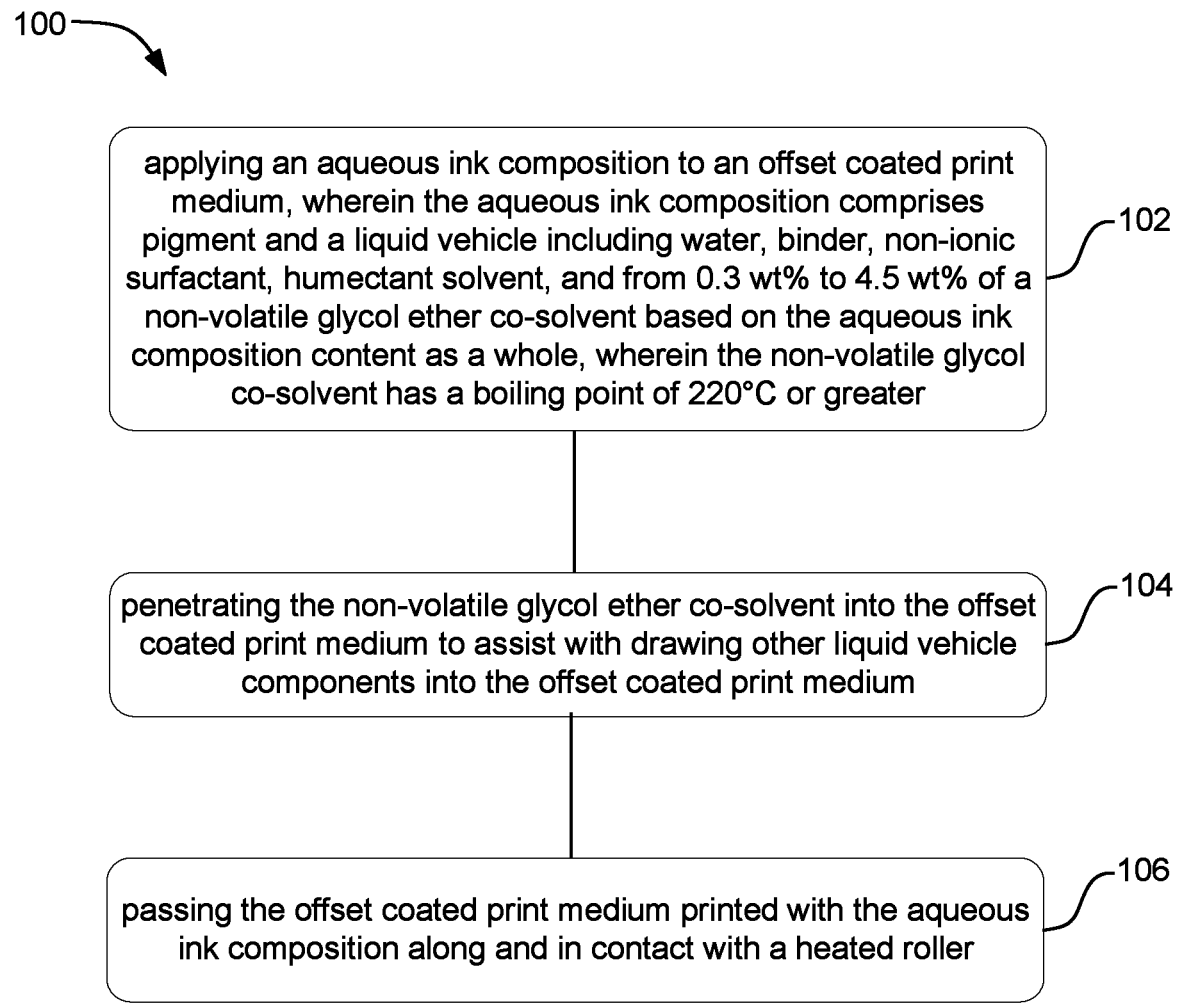
FIG. 1 schematically displays an example method for printing on offset coated print media in accordance with the present disclosure.

One challenge in digitally printing images using aqueous inks on coated offset media is the propensity for the inks to smear, especially when the images are printed at high speeds (from about 100 to 800 feet per minute (fpm)). Coated offset media does not readily absorb aqueous inks as well as uncoated media due to the hydrophobic surface of the medium. In the area of high speed inkjet printing, such as with an HP Web Press®, when an ink does not dry fast enough, a portion of the ink can build up on the press rollers and/or the take-up reel. The heat that can be transferred from the dryer to the media is often times not sufficient to evaporate and dry the ink before the media is taken up by the wet turn rollers. In some setups, less than a second passes before the printed images on the coated medium wraps around a wet turn roller.

In further detail, wet ink that is present on the surface of the medium can build up on the wet turn rollers resulting in smudged and smeared printed images and printed images that have portions of the image/text lifted off from the surface of the image. This damage can occur (i) by the ink rubbing off onto the rollers, (ii) by built up ink that is on the rollers transferring off the rollers onto successively printed images, and/or (ii) by the built up ink creating a sticky surface that lifts off a portion of the image/text on the successive print. Aqueous ink compositions that penetrate into the coated offset medium and permit faster drying times would be desirable.

In one example, the present disclosure is drawn to an aqueous ink composition for coated offset media. The aqueous ink composition can include from 2 wt % to 5 wt % pigment, from 70 wt % to 95 wt % water, from 1 wt % to 10 wt % binder, from 0.1 wt % to 3 wt % non-ionic surfactant, from 1 wt % to 15 wt % humectant solvent including a hydrophilic group, and from 0.3 wt % to 4.5 wt % non-volatile glycol ether co-solvent having a boiling point of 220° C. or greater. These weight percentages are based on the aqueous ink composition.

In another example, a method of printing on offset coated print media is disclosed. The method can include applying an aqueous ink composition to an offset coated print medium, penetrating the non-volatile glycol ether co-solvent into the offset coated print medium to assist with drawing other liquid vehicle components into the offset coated print medium, and passing the offset coated print medium printed with the aqueous ink composition along and in contact with a heated roller. The aqueous ink composition can include pigment and a liquid vehicle including water, binder, non-ionic surfactant, humectant solvent, and from 0.3 wt % to 4.5 wt % of a non-volatile glycol ether co-solvent having a boiling point of 220° C. or higher. The weight percentages here and elsewhere are based on the aqueous ink composition content as a whole.

In yet another example, a printing system is disclosed. The printing system can include an aqueous ink composition and an offset coated print medium. The aqueous ink composition can include pigment, water, binder, non-ionic surfactant, humectant solvent including a hydrophilic group, and from 0.3 wt % to 4.5 wt % non-volatile glycol ether co-solvent having a boiling point of 220° C. or greater.

Turning now to the aqueous ink composition. In one example, the aqueous ink composition can include from 2 wt % to 5 wt % pigment, from 70 wt % to 95 wt % water, from 1 wt % to 10 wt % binder, from 0.1 wt % to 3 wt % non-ionic surfactant, from 1 wt % to 15 wt % humectant solvent including a hydrophilic group, and from 0.3 wt % to 4.5 wt % non-volatile glycol ether co-solvent having a boiling point of 220° C. or greater, where the weight percentages are based on the aqueous ink composition.

With specific reference to the pigment, the pigment is not particularly limited. The particular pigment used will depend on the colorists desires in creating the composition. Pigment colorants can include cyan, magenta, yellow, black, red, blue, orange, green, pink, etc. The pigment can be dispersed with a separate polymer dispersant, or can be a self-dispersed pigment.

Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), nitropigments, nitroso pigments, anthanthrone pigments such as PR168, and the like. Representative examples of phthalocyanine blues and greens include copper phthalocyanine blue, copper phthalocyanine green and derivatives thereof such as Pigment Blue 15, Pigment Blue 15:3, and Pigment Green 36. Representative examples of quinacridones include Pigment Orange 48, Pigment Orange 49, Pigment Red 122, Pigment Red 192, Pigment Red 202, Pigment Red 206, Pigment Red 209, Pigment Violet 19, and Pigment Violet 42. Representative examples of anthraquinones include Pigment Red 43, Pigment Red 194, Pigment Red 177, Pigment Red 216, and Pigment Red 226. Representative examples of perylenes include Pigment Red 123, Pigment Red 190, Pigment Red 189, and Pigment Red 224. Representative examples of thioindigoids include Pigment Red 86, Pigment Red 87, Pigment Red 198, Pigment Violet 36, and Pigment Violet 38. Representative examples of heterocyclic yellows include Pigment Yellow 1, Pigment Yellow 12, Pigment Yellow 13, Pigment Yellow 14, Pigment Yellow 17, Pigment Yellow 73, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Other pigments that can be used include Pigment Blue 15:3, DIC-QA Magenta Pigment, Pigment Red 150, and Pigment Yellow 74. Such pigments are commercially available in powder, press cake, or dispersions form from a number of sources. If the colorist desires, two or more pigments can be combined to create novel color compositions.

Water can be a substantial component of the aqueous ink composition. In one example, the water can range from about 70 wt % to about 95 wt % of the composition. In another example, the water can range from about 70 wt % to about 92.2 wt % of the composition. In yet another example, the water can range from about 80 wt % to about 90 wt % of the composition. In some formulations, the water can be deionized.

Turning now to the binder, in one example, the binder can include polyurethane, polyurea, polyurethane with a curable double bond, polyurethane-graph polyol, or a combination thereof. In one example, the binder can include a polyurethane having an average molecular weight ranging from 10,000 MW to 100,000 MW. In another example, the polyurethane can have an average molecular weight ranging from 15,000 MW to 50,000 MW. In yet another example, the binder can be a polyurethane having a curable double bond. In one example, the polyurethane having a curable double bond can be (n-(2-hydroxyethyl)acrylamide2-hydroxyethyl acrylate, 2-hydroxypropyl bis-methyl methacrylate, or a combination thereof. In another example, the binder can include a polyurethane graph polyol. In a further example, the binder can include a polyurethane graph polyol such as PUG-49, PUG-84, PUG-400 or Pluracol® (available from BASF, New Jersey). In yet another example, the binder can be any of the previously mentioned binders and can further include an acrylic functional group. For example, the binder can include methyl methacrylate, 2-ethylhexyl acrylate, 2-(2-ethoxyethoxy)ethyl acrylate, or a combination thereof.

In one example, the binder can be present in the aqueous ink composition from about 1 wt % to about 10 wt %. In another example, the binder can be present in the aqueous ink composition from about 1 wt % to about 5 wt %. In yet another example, the binder can be present in the aqueous ink composition from about 2 wt % to about 8 wt %. In another example, the binder can be present in the aqueous ink composition from about 5 wt % to about 10 wt %. In a further example, the binder can be present from about 3 wt % to about 7 wt %.

Turning now to the non-ionic surfactant. In one example, the non-ionic surfactant can include Surfynol® SE-F, Dynol™ 360, Surfynol® S104, Surfynol® S440, Surfynol® CT-211, or a combination thereof (all available from Air Products & Chemicals Inc., Pennsylvania). In another example, the non-ionic surfactant can include, Surfynol® SE-F, Surfynol® S440, or Surfynol® CT-2011. In yet another example, the non-ionic surfactant can include Dynol™ 360.

The non-ionic surfactant can be present in the ink composition at varying concentrations. In one example, the non-ionic surfactant can be present in the aqueous ink composition at from about 0.1 wt % to about 3 wt %. In another example, the non-ionic surfactant can be present in the aqueous ink composition from about 0.2 wt % to 2 wt %. In yet another example, the non-ionic surfactant can be present from about 0.2 wt % to about 1 wt %. In a further example, the non-ionic surfactant can be present from about 1 wt % to about 3 wt %. In one example, the non-ionic surfactant can be present from about 0.5 wt % to about 1 wt %.

Turning now to the humectant solvent including a hydrophilic group. In one example, the humectant solvent can include glycerol, Dantocol® DHE (Di-(2-hydroxyethyl)-5, 5 dimethylhydantoin) (available from Lonza® Inc., New Jersey), tetraethylene glycol, tripropylene glycol, 2-hydroxyethyl pyrrolidone (2HE2P), LEG-1, or combinations thereof. In one example, the humectant solvent can include glycerol. In yet another example, the humectant solvent can include 2-hydroxyletheyl-2-pyrrolidone. In a further example, the humectant solvent can include tripropylene glycol. In yet a further example, the humectant solvent can include glycerol, 2-hydroxyletheyl-2-pyrrolidone, LEG-1, or a combination thereof.

The humectant solvent can be present in the aqueous ink composition at varying amounts. In one example, the humectant solvent can be present from about 1 wt % to about 15 wt % of the aqueous ink composition. In another example, the humectant solvent can be present from about 1 wt % to about 10 wt %. In a further example, the humectant solvent can be present from about 2 wt % to about 10 wt %. In yet another example, the humectant solvent can be present from about 3 wt % to about 8 wt %.

Turning now to the non-volatile glycol ether co-solvent. In one example, the non-volatile ether co-solvent can include tripropyleneglycol methyl ether, dipropylene glycol butyl ether, diethylene glycol ethyl ether, propylene glycol phenyl ether, or a combination thereof. In another example, the non-volatile glycol ether co-solvent can be tripropyleneglycol methyl ether. In another example, the non-volatile glycol ether co-solvent can be dipropylene glycol butyl ether, diethylene glycol ethyl ether, or a combination thereof. In a further example, the non-volatile glycol ether co-solvent can be propylene glycol ether.

In some examples, the boiling point of the non-volatile glycol ether co-solvent can be 220° C. as mentioned, or can be 240° C. or greater. Examples of non-volatile glycol ether co-solvents having a boiling point over 240° C. can include tripropylene glycol methyl ether, dipropylene glycol butyl ether, or tripropylene glycol propyl ether. In one example, the non-volatile glycol ether co-solvent can be a non-hazardous substance as determined by the EPA at the time of filing the present disclosure. In some examples, the non-volatile glycol ether co-solvent can be hydrophobic and/or include hydrophobic functional groups.

The non-volatile glycol ether co-solvent can be present in the aqueous ink composition at varying concentrations. In one example, the non-volatile glycol ether co-solvent can be present at from about 0.3 wt % to about 4.5 wt %. In another example, the non-volatile glycol ether co-solvent can be present from about 1 wt % to about 3 wt %. In yet another example, the non-volatile glycol ether co-solvent can be present at from about 2 wt % to about 3 wt %. In a further example, the nonvolatile glycol ether co-solvent can be present from about 0.5 wt % to about 2 wt %. Higher concentrations may not provide desired results, as this type of co-solvent tends to swell the binder that is also included. For example, an ink formulation created having a high concentration of 10 wt % or higher of non-volatile glycol ether co-solvent can increase the viscosity of the ink composition such that the formulation cannot pass through inkjet print heads. Non-volatile glycol ether co-solvent used ranging from above 4.5 wt % to 10 wt % may also generate print reliability issues as well. Alternatively, in some instances, if there is not enough of the other solvent present, reliability issues related to swelling the binder may also occur.

In some examples, the non-volatile glycol ether co-solvent can allow for penetration into the hydrophobic surface of the coated offset media, thereby increasing the penetration rate of the ink. In some examples, the combination of the solvent and the co-solvent can complement one another. For example, the solvent can be Dantocol® DHE (di-(2-hydroxyethyl)-5, 5 dimethylhydantoin) (available from Lonza® Inc., New Jersey), tetraehtylene glycol, or glycerol and the co-solvent can be tripropyleneglycol methyl ether. These combinations can allow for optimized IQ—bleed, text quality, and mechability. Furthermore, the non-volatile glycol ether co-solvent can penetrate the surface of the offset coated media and can assist in drawing other solvent and the water into the offset coated medium. Once the non-volatile glycol ether co-solvent, other solvent(s), and water are absorbed into the offset coated medium, the binder can form a film on the print surface. In one example, the aqueous ink compositions can provide absorption and film formation without the use of an offline primer.

The aqueous ink composition presented herein, can be an aqueous ink composition and can have a low viscosity. In one example, the viscosity can range from about 1 cps to about 4 cps. In a further example, the viscosity of the ink composition can range from about 1 cps to about 3 cps. Maintaining a low viscosity enables the composition to be compatible with various high speed print heads.

In some examples, the aqueous ink composition can further include an emulsifying agent. In one example, the emulsifying agent can include a phosphate ester, Crodafos™ N3 (Croda Inc., New Jersey), Joncryl® 671, Joncryl® 680, Joncryl® 683 (all available from BASF, North America), or a combination thereof. In one example, the emulsifying agent can be present in the formulation from about 0 wt % to about 3 wt %. In another example, the emulsifying agent can be present from about 0.5 wt % to about 2 wt %. In yet another example, the emulsifying agent can be present in the formulation from about 1 wt % to about 2 wt %.

In some formulations, the aqueous ink composition can further include a wax. In one example, the wax can include Aquaslip™, Liquilube™, (both available from Lubrizol, Ohio) polypropylene wax, paraffin wax, carnauba wax, or a combination thereof. In one example, the wax can be Liquilube™. The wax can be present in the formulation from about 0 wt % to about 3 wt %. In one example, the wax can be present from about 0.2 wt % to about 2.5 wt %. In another example, the wax can be present from about 0.3 wt % to about 2 wt %. In yet another example, the wax can be present from about 0.5 wt % to about 1 wt %.

Various other additives can also be included in the composition to provide desired properties. For example, the additives that can be added to inhibit the growth of harmful microorganisms and can include biocides, fungicides, and other microbial agents, which are routinely used in ink formulations. Examples of suitable microbial agents include, but are not limited to, Acticide® (Thor Specialties Inc. UK), Nuosept™ (Troy Corp., New Jersey), Ucarcide™ (Union Carbide Corp., Texas), Vancide® (R.T. Vanderbilt Co. Connecticut), Proxel™ (Lonza® Inc., New Jersey), and combinations thereof. Sequestering agents such as EDTA (ethylene diamine tetra acetic acid) can also be included to eliminate the deleterious effects of heavy metal impurities, and buffer solutions may be used to control the pH of the ink. Viscosity modifiers, and buffers can also be present, as well as other additives known to those skilled in the art to modify properties of the ink as desired.

The aqueous ink composition presented herein can exhibit an accelerated penetration into offset coated media and can dry quickly. In one example, the aqueous ink composition can dry within 1 to 15 seconds when printed at 1 to 5 dpp coverage on an offset coated print medium, or within 3 to 15 seconds under the same conditions. In another example, the aqueous ink composition can dry within 3 to 10 seconds when printed at 1 to 5 dpp coverage on an offset coated print medium. This improvement in drying time can be advantageous in high speed digital printing.

Further presented herein, is a method for printing on offset coated print media. In one example, shown in FIG. 1, a method 100 can include applying 102 an aqueous ink composition to an offset coated print medium, penetrating 104 the non-volatile glycol ether co-solvent into the offset coated print medium to assist with drawing other liquid vehicle components into the offset coated print medium, and passing 106 the offset coated print medium printed with the aqueous ink composition along and in contact with a heated roller. The aqueous ink composition can include pigment and a liquid vehicle including water, binder, non-ionic surfactant, humectant solvent, and from 0.3 wt % to 4.5 wt % of a non-volatile glycol ether co-solvent having a boiling point of 220° C. or greater. The weight percentages can be based on the aqueous ink composition content as a whole.

The method presented herein can provide smear free prints at high printing speed with little to no ink being transferred to the print rollers. In one example, the method can provide smear free prints at a printing speed from 100 fpm to 800 fpm. In another example, the method can provide smear free prints at printing speeds from 400 fpm to 800 fpm. In yet another example, the method can provide smear free prints at a printing speed of about 600 fpm. In a further example, the method can provide smear free prints when printed at print speeds of about 400 fpm to 600 fpm.

As previously mentioned, after the ink is printed on the coated offset media, the images passes through a hot roller. In one example of the method, the heated roller can be at a temperature ranging from about 70° C. to about 140° C. In another example, the heated roller can be at a temperature of about 100° C. In yet another example, the heated roller can be at a temperature ranging from about 90° C. to about 120° C.

Additionally presented herein is a printing system. In one example, the printing system can include an aqueous ink composition and an offset coated print medium. In one example, the aqueous ink composition can include pigment, water, binder, non-ionic surfactant, humectant solvent including a hydrophilic group, and from 0.3 wt % to 4.5 wt % non-volatile glycol ether co-solvent having a boiling point of 220° C. or greater.

In one example, the aqueous ink composition can be as described above. In another example, the non-volatile glycol ether co-solvent component of the aqueous ink composition can include tripropyleneglycol methyl ether, dipropylene glycol butyl ether, diethylene glycol ethyl ether, propylene glycol phenyl ether, or a combination thereof, and can be present at from 1 wt % to 3 wt %. In yet another example, the aqueous ink composition can include pigment at from 2 to 5 wt %, water at from 70 wt % to 95 wt %, binder at from 1 wt % to 10 wt %, non-ionic surfactant at from 0.1 wt % to 3 wt %, and humectants at from 1 wt % to 15 wt %.

The offset coated printed medium, can include any commercially available medium. In one example, the offset coated printed media can be Kemi Graph Plus (MetsäBoard, Europe), Rieger ECD, or Modo Northen Light (MNL) Litho (MetsäBoard, Europe). In one example, the offset coated printed media can be Kemi Graph Plus. In another example, the offset coated printed media can be Rieger ECD. The factors to be considered when choosing the offset coated printed medium are the pore size and the absorption rate. In some examples, the offset coated print media can have a weight of about 140 gsm to about 220 gsm.

It is noted that, as used in this specification and the appended claims, the singular forms "a," "an," and "the" include plural referents unless the context clearly dictates otherwise.

As used herein, the term "humectant solvent" refers to a solvent having two or more hydroxyl groups. In some instances, a humectant solvent can include any water soluble solvent exhibiting high boiling which will decrease the evaporation rate and behaving as a pseudo-humectant.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described

EXAMPLES

The following illustrates several examples of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements

Example 1—Ink Formulations

Four different aqueous ink compositions were prepared. In order to formulate the compositions, the binder, humectant solvents, emulsifying agents, non-ionic surfactant, and co-solvent were combined and then the wax was added and mixed to form the ink vehicle. The ink vehicle was then mixed with the pigment. Each of these compositions had the formulation as shown in Tables 1-4 below.

TABLE 1

| Formulation 1 (F1) | | |
| --- | --- | --- |
| Component* | Function | Weight Percentage |
| PUG-84 | Binder | 5 wt % |
| 2-hydroxyletheyl-2-pyrrolidone | Humectant solvent | 5 wt % |
| LEG-1 | Humectant solvent | 2 wt % |
| Crodafos ™ N3 | Emulsifying Agent | 0.5 wt % |
| Liquilube ™ Wax | Wax | 1 wt % |
| 0.2% Surfynol ® 104 + 0.2% Dynol ™ 360 | Non-ionic surfactant | 0.4 wt % |
| Colorant developed internally | Pigment | Black 2.75% Cyan 2.25% Magenta 4.0% |
| Water | Solvent | Balance |

*Crodafos ™ N3 (Croda Inc., New Jersey); liquilube ™, (Lubrizol, Ohio), Surfynol ® 104, and Dynol ™ 360, (both available from Air Products & Chemicals Inc., Pennsylvania).

TABLE 2

| Formulation 2 (F2) | | |
| --- | --- | --- |
| Component* | Function | Weight Percentage |
| PUG-84 | Binder | 5 wt % |
| Glycerol | Humectant solvent | 4 wt % |
| 2-hydroxyletheyl-2-pyrrolidone | Humectant solvent | 1 wt % |
| LEG-1 | Humectant solvent | 2 wt % |
| Crodafos ™ N3 | Emulsifying Agent | 0.5 wt % |
| Liquilube ™ Wax | Wax | 1 wt % |
| 0.2% Surfynol ® 104 + 0.2% Dynol ™ 360 | Non-ionic surfactant | 0.4 wt % |
| Colorant developed internally | Pigment | Black 2.75% Cyan 2.25% Magenta 4.0% |
| Water | Solvent | Balance |

*Crodafos ™ N3 (Croda Inc., New Jersey); liquilube ™, (Lubrizol, Ohio), Surfynol ® 104, and Dynol ™ 360, (both available from Air Products & Chemicals Inc., Pennsylvania).

TABLE 3

| Formulation 3 (F3) | | |
| --- | --- | --- |
| Component* | Function | Weight Percentage |
| PUG-84 | Binder | 5 wt % |
| Glycerol | Humectant solvent | 5 wt % |

TABLE 3-continued

Formulation 3 (F3)

| Component* | Function | Weight Percentage |
|---|---|---|
| LEG-1 | Humectant solvent | 2 wt % |
| Crodafos ™ N3 | Emulsifying Agent | 0.5 wt % |
| Liquilube ™ Wax | Wax | 1 wt % |
| 0.2% Surfynol ® 104 + 0.2% Dynol ™ 360 | Non-ionic surfactant | 0.4 wt % |
| Colorant developed internally | Pigment | Black 2.75% Cyan 2.25% Magenta 4.0% |
| Water | Solvent | Balance |

*Crodafos ™ N3 (Croda Inc., New Jersey); liquilube ™, (Lubrizol, Ohio), Surfynol ® 104, and Dynol ™ 360, (both available from Air Products & Chemicals Inc., Pennsylvania).

TABLE 4

Formulation 4 (F4)

| Component* | Function | Weight Percentage |
|---|---|---|
| PUG-84 | Binder | 5 wt % |
| Glycerol | Humectant solvent | 2 wt % |
| Tripropyleneglycol methyl ether | Non-volatile glycol ether co-solvent | 3 wt % |
| LEG-1 | Humectant solvent | 2 wt % |
| Crodafos ™ N3 | Emulsifying Agent | 0.5 wt % |
| Liquilube ™ Wax | Wax | 1 wt % |
| 0.2% Surfynol ® 104 + 0.2% Dynol ™ 360 | Non-ionic surfactant | 0.4 wt % |
| Colorant developed internally | Pigment | Black 2.75% Cyan 2.25% Magenta 4.0% |
| Water | Solvent | Balance |

*Crodafos ™ N3 (Croda Inc., New Jersey); liquilube ™, (Lubrizol, Ohio), Surfynol ® 104, and Dynol ™ 360, (both available from Air Products & Chemicals Inc., Pennsylvania).

Formulations 1-3 did not include a non-volatile glycol ether co-solvent, but rather included varied combinations of solvents. Formulation 4 included 3 wt % of a non-volatile glycol ether co-solvent.

Example 2—Smear Tests F1-F4

The ink compositions from Example 1 above were printed onto an offset coated media. The images were printed on an Innovator at a drop speed of 2 gsm of ink and 0.75 gsm of fixer on Graph Plus coated media at 100 feet per minute (fpm). The prints were dried for 5 seconds using convective drying at 375° F. before passing through a hot roller at 100° C. This experiment was conducted in triplicate for each ink formulation.

Figure 2:
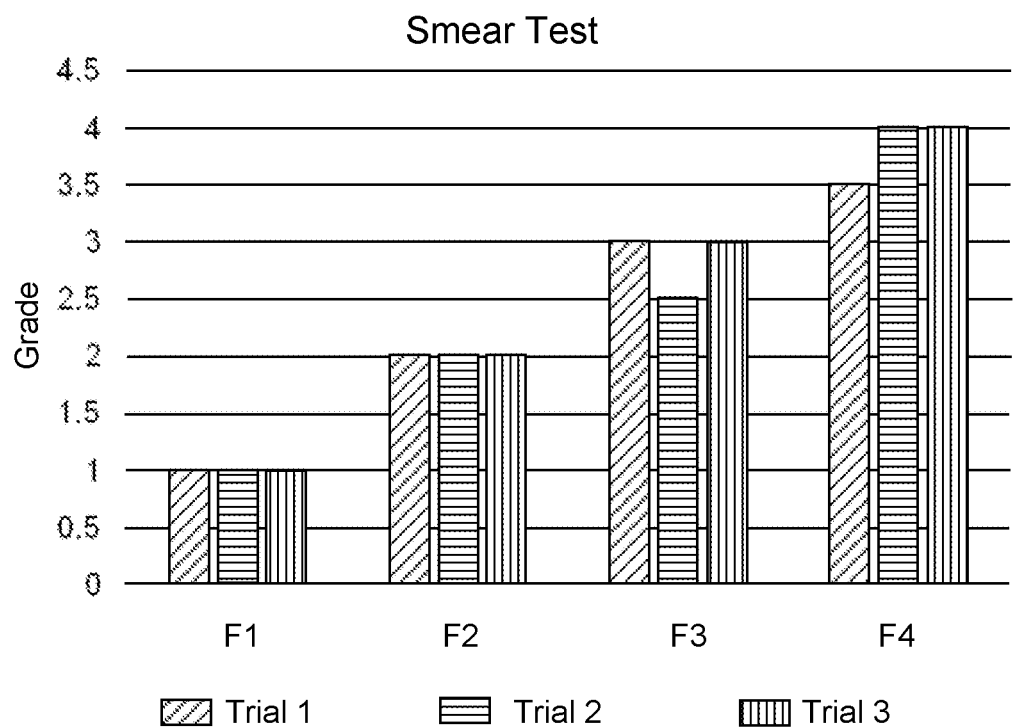
FIG. 2 graphically displays a bar graph of the results of smear experiments on offset coated print media printed at 100 feet per minute (fpm) using various solvent combinations in accordance with examples of the present disclosure.
Figure 3:
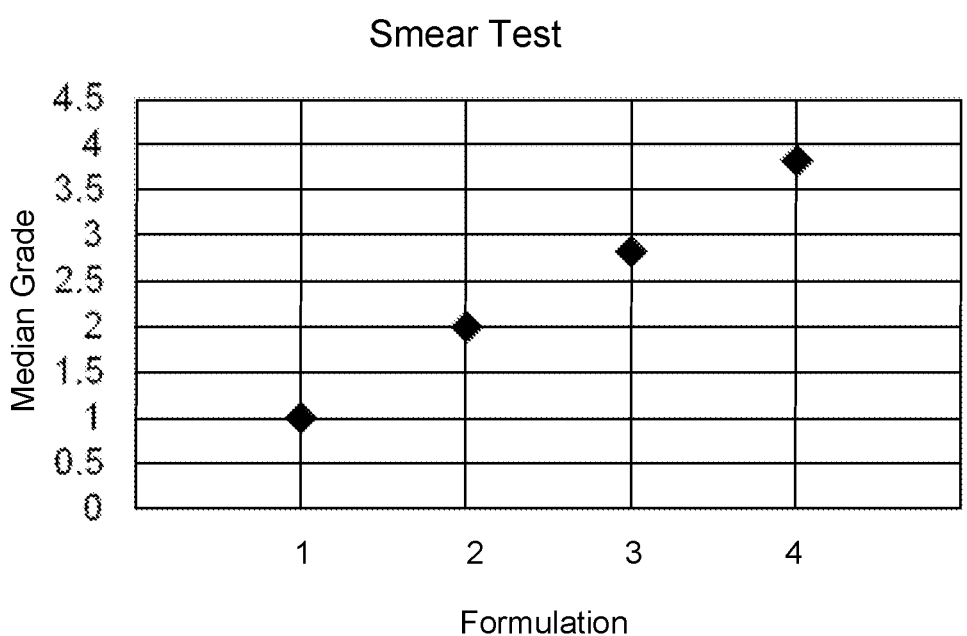
FIG. 3 graphically displays a scatter plot of the median results of smear experiments on offset coated print media printed at 100 feet per minute (fpm) using various solvent combinations in accordance with examples of the present disclosure.

The printed images were analyzed to determine the amount of damage that occurred to the image. The images that were not dry had the most amount of lift out and exhibited visual damage. The images that were dry were not damaged. The results are shown in Table 5 below, where 1 indicates the most damage and 5 indicates no damage. The results are also graphically presented in FIGS. 2 and 3.

TABLE 5

Smear Test Results

| | Trial 1 | Trial 2 | Trial 3 | Median |
|---|---|---|---|---|
| F1 | 1 | 1 | 1 | 1 |
| F2 | 2 | 2 | 2 | 2 |
| F3 | 3 | 2.5 | 3 | 2.833333 |
| F4 | 3.5 | 4 | 4 | 3.833333 |

The images having the least amount of damage were printed using Formulation 4. Formulation 4 incorporates a non-volatile glycol ether co-solvent. As can be seen in the table above, and in FIGS. 2 and 3, the addition of the non-volatile glycol ether co-solvent improved the drying speed of the ink formulation on the offset coated media and minimized the amount of print damage.

Example 3—Ink Formulations F5-F8

Four different aqueous ink compositions were prepared using the method presented in Example 1. In the formulations a different binder was used. Each of these compositions had the formulation as shown in Tables 6-8 below.

TABLE 6

Formulation 5 (F5)

| Component* | Function | Weight Percentage |
|---|---|---|
| PUG-409 | Binder | 5 wt % |
| Glycol | Humectant solvent | 2 wt % |
| Tripropyleneglycol methyl ether | Non-volatile glycol ether co-solvent | 3 wt % |
| LEG-1 | Humectant solvent | 2 wt % |
| Crodafos ™ N3 | Emulsifying Agent | 0.5 wt % |
| Liquilube ™ Wax | Wax | 1 wt % |
| 0.2% Surfynol ® 440 + 0.2% Dynol ™ 360 | Non-ionic surfactant | 0.4 wt % |
| Colorant developed internally | Pigment | Black 2.75% Cyan 2.25% Magenta 4.0% |
| Water | Solvent | Balance |

*Crodafos ™ N3 (Croda Inc., New Jersey); liquilube ™, (Lubrizol, Ohio), Surfynol ® 440, and Dynol ™ 360, (both available from Air Products & Chemicals Inc., Pennsylvania).

TABLE 7

Formulation 6 (F6)

| Component | Function | Weight Percentage |
|---|---|---|
| PUG-409 | Binder | 5 wt % |
| Glycerol | Humectant solvent | 6 wt % |
| Tripropyleneglycol methyl ether | Non-volatile glycol ether co-solvent | 3 wt % |
| LEG-1 | Humectant solvent | 2 wt % |
| Crodafos ™ N3 | Emulsifying Agent | 0.5 wt % |
| Liquilube ™ Wax | Wax | 1 wt % |
| 0.2% Surfynol ® 440 + 0.2% Dynol ™ 360 | Non-ionic surfactant | 0.4 wt % |
| Colorant developed internally | Pigment | Black 2.75% Cyan 2.25% Magenta 4.0% |
| Water | Solvent | Balance |

*Crodafos ™ N3 (Croda Inc., New Jersey); liquilube ™, (Lubrizol, Ohio), Surfynol ® 440, and Dynol ™ 360, (both available from Air Products & Chemicals Inc., Pennsylvania).

TABLE 8

Formulation 7 (F7)

| Component* | Function | Weight Percentage |
|---|---|---|
| PUG-409 | Binder | 5 wt % |
| Glycerol | Humectant solvent | 6 wt % |
| LEG-1 | Humectant solvent | 2 wt % |
| Crodafos ™ N3 | Emulsifying Agent | 0.5 wt % |
| Liquilube ™ Wax | Wax | 1 wt % |
| 0.2% Surfynol ® 440 + 0.2% Dynol ™ 360 | Non-ionic surfactant | 0.4 wt % |
| Colorant developed internally | Pigment | Black 2.75% Cyan 2.25% Magenta 4.0% |
| Water | Solvent | Balance |

*Crodafos ™ N3 (Croda Inc., New Jersey); liquilube ™, (Lubrizol, Ohio), Surfynol ® 440, and Dynol ™ 360, (both available from Air Products & Chemicals Inc., Pennsylvania).

TABLE 9

Formulation 8 (F8)

| Component | Function | Weight Percentage |
|---|---|---|
| PUG-409 | Binder | 5 wt % |
| 2-hydroxyletheyl-2-pyrrolidone | Humectant solvent | 6 wt % |
| LEG-1 | Humectant solvent | 2 wt % |
| Crodafos ™ N3 | Emulsifying Agent | 0.5 wt % |
| Liquilube ™ Wax | Wax | 1 wt % |
| 0.2% Surfynol ® 440 + 0.2% Dynol ™ 360 | Non-ionic surfactant | 0.4 wt % |
| Colorant developed internally | Pigment | Black 2.75% Cyan 2.25% Magenta 4.0% |
| Water | Solvent | Balance |

*Crodafos ™ N3 (Croda Inc., New Jersey); liquilube ™, (Lubrizol, Ohio), Surfynol ® 440, and Dynol ™ 360, (both available from Air Products & Chemicals Inc., Pennsylvania).

Formulation 5 was the same as Formulation 4, except a different binder was used. Formulation 6 incorporated a higher amount of solvent but was otherwise similar to Formulation 5. Both Formulations 5 and 6 incorporated a non-volatile glycol ether co-solvent. Formulation 7 was similar to Formulation 6 except it did not include a non-volatile glycol ether co-solvent. Formulation 8 was similar to Formulation 7 except it incorporated a different solvent.

Example 4—Smear Tests F5-F8

The ink compositions from Example 3 above were printed onto an offset coated media. The images were printed on an Innovator at a drop speed of 2 gsm of ink and 0.75 gsm of fixer on Graph Plus coated media at 100 feet per minute (fpm). The prints were dried for 5 seconds using convective drying at 375° F. before passing through a hot roller at 100° C. This experiment was conducted in triplicate for each ink formulation.

Figure 4:
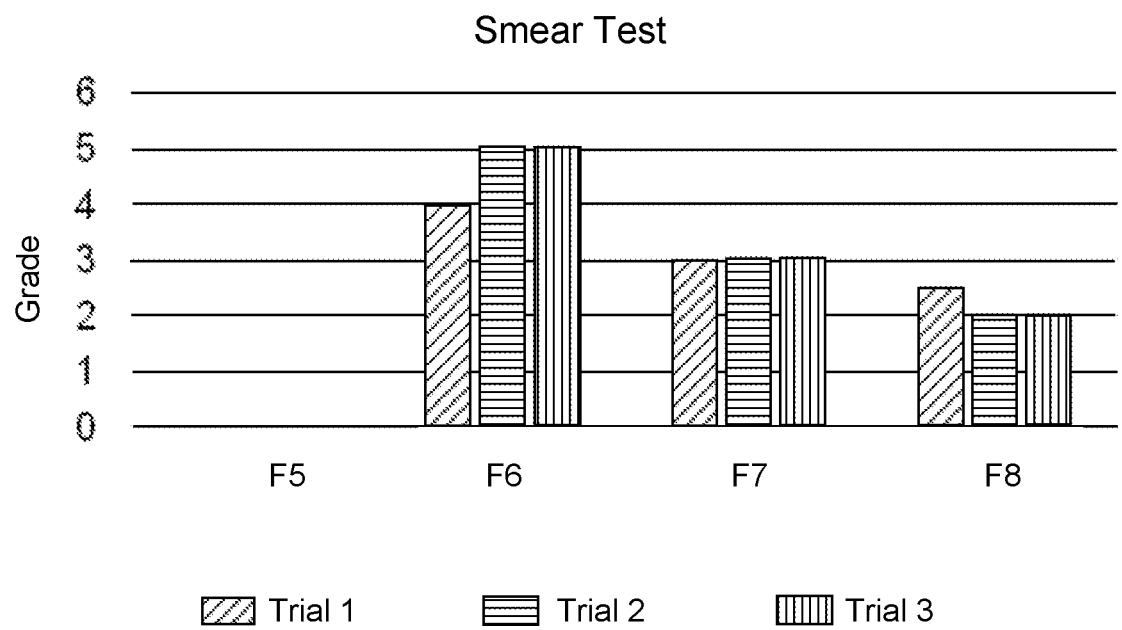
FIG. 4 graphically displays a bar graph of the results of smear experiments on offset coated print media printed at 100 feet per minute (fpm) using various solvent combinations in accordance with examples of the present disclosure.
Figure 5:
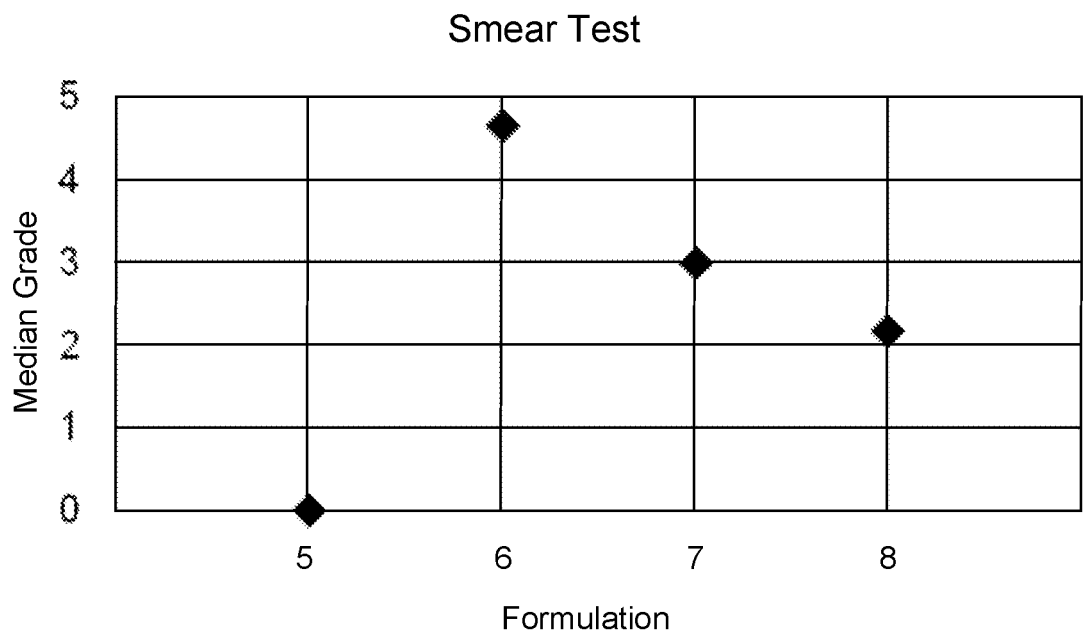
FIG. 5 graphically displays a scatter plot of the median results of smear experiments on offset coated print media printed at 100 feet per minute (fpm) using various solvent combinations in accordance with examples of the present disclosure.

The printed images were analyzed to determine the amount of damage that occurred to the image. The images that were not dry had the most amount of lift out and exhibited visual damage. The images that were dry were less damaged. The results are shown in Table 10 below, where 1 indicates the most damage and 5 indicates no damage. The results are also graphically presented in FIGS. 4 and 5.

TABLE 10

Smear Test Results

| | Trial 1 | Trial 2 | Trial 3 | Median |
|---|---|---|---|---|
| F5 | 0 | 0 | 0 | 0 |
| F6 | 4 | 5 | 5 | 4.666667 |
| F7 | 3 | 3 | 3 | 3 |
| F8 | 2.5 | 2 | 2 | 2.166667 |

Formulation 5 exhibited print reliability issues during printing so no data was obtained. This indicated that a higher solvent load was desirable for use with this particular binder in the formulation. With respect to Formulations 6-8, the images receiving the least amount of damage were printed using Formulation 6. Formulation 6 incorporates a non-volatile glycol ether co-solvent. Formulation 6 is similar to Formulations 7 and 8 with the exception that the non-volatile glycol ether co-solvent was replaced. As can be seen in the table above, and in FIGS. 4 and 5, the addition of the non-volatile glycol ether co-solvent improved the drying speed of the ink formulation on the offset coated media and minimized the amount of print damage.

Example 5—Print Test

Formulations 1 and 6 above were printed on Graph Plus coated media using a HP Web Press® printer. The images were printed with 2 gsm of ink and 0.75 gsm of fixer on at 100 fpm. The image printed using Formulation 1 created an approximately 1 inch wide strip of ink buildup on the roller. The image printed using Formulation 6 did not appear to leave any ink residue on the roller.

What is claimed is:

1. An aqueous ink composition, comprising:
   from 2 wt % to 5 wt % pigment,
   from 70 wt % to 95 wt % water,
   from 1 wt % to 10 wt % binder,
   from 0.1 wt % to 3 wt % non-ionic surfactant,
   from 1 wt % to 15 wt % humectant solvent including a hydrophilic group, and
   from 0.3 wt % to 4.5 wt % non-volatile glycol ether co-solvent having a boiling point of 220° C. or greater.

2. The aqueous ink composition of claim 1, wherein the binder comprises polyurethane, polyurea, polyurethane with a curable double bond, polyurethane-graph polyol, or a combination thereof.

3. The aqueous ink composition of claim 1, wherein the binder comprises polyurethane-graph polyol.

4. The aqueous ink composition of claim 1, wherein the humectant solvent comprises glycerol, di-(2-hydroxyethyl)-5, 5 dimethylhydantoin, tetraethylene glycol, tripropylene glycol, 2-hydroxyethyl pyrrolidone (2HE2P), LEG-1 or combinations thereof.

5. The aqueous ink composition of claim 1, wherein the boiling point of the non-volatile glycol ether co-solvent is 240° C. or greater.

6. The aqueous ink composition of claim 1, wherein the non-volatile glycol ether co-solvent comprises tripropyleneglycol methyl ether, dipropylene glycol butyl ether, diethylene glycol ethyl ether, propylene glycol phenyl ether, or a combination thereof.

7. The aqueous ink composition of claim 1, wherein the non-volatile glycol ether co-solvent is present at from 1 wt % to 3 wt %.

8. The aqueous ink composition of claim 1, having a viscosity from 1 cps to 4 cps.

9. The aqueous ink composition of claim 1, wherein the aqueous ink composition dries within 1 to 15 seconds when printed at 1 to 5 dpp coverage on an offset coated print medium.

10. A method of printing on offset coated print media, comprising:
- applying an aqueous ink composition to an offset coated print medium, wherein the aqueous ink composition comprises pigment and a liquid vehicle including water, binder, non-ionic surfactant, humectant solvent, and from 0.3 wt % to 4.5 wt % of a non-volatile glycol ether co-solvent based on the aqueous ink composition content as a whole, wherein the non-volatile glycol co-solvent has a boiling point of 220° C. or greater;
- penetrating the non-volatile glycol ether co-solvent into the offset coated print medium to assist with drawing other liquid vehicle components into the offset coated print medium; and
- passing the offset coated print medium printed with the aqueous ink composition along and in contact with a heated roller.

11. The method of claim 10, wherein the method is carried out at a printing speed from 100 fpm to 800 fpm.

12. The method of claim 10, wherein the heated roller is at a temperature from 70° C. to 140° C.

13. A printing system, comprising:
- an aqueous ink composition, including pigment, water, binder, non-ionic surfactant, humectant solvent including a hydrophilic group, and from 0.3 wt % to 4.5 wt % non-volatile glycol ether co-solvent having a boiling point of 220° C. or greater; and
- an offset coated print medium.

14. The printing system of claim 13, wherein the non-volatile glycol ether co-solvent comprises tripropyleneglycol methyl ether, dipropylene glycol butyl ether, diethylene glycol ethyl ether, propylene glycol phenyl ether, or a combination thereof, and is present at from 1 wt % to 3 wt %.

15. The printing system of claim 13, wherein the pigment is present from 2 wt % to 5 wt %, the water is present at from 70 wt % to 95 wt %, the binder is present at from 1 wt % to 10 wt %, the non-ionic surfactant is present at from 0.1 wt % to 3 wt %, and the humectants is present at from 1 wt % to 15 wt %.

16. The aqueous ink composition of claim 1, wherein the humectant solvent includes LEG-1 and further includes glycerol, glycol, or 2-hydroxylethyl-2-pyrrolidone.

17. The aqueous ink composition of claim 1, wherein the binder includes a polyurethane having a weight average molecular weight from 10,000 Mw to 100,000 Mw and wherein the ink composition has a viscosity from about 1 cps to about 4 cps.

* * * * *